United States Patent [19]

Casey et al.

[11] 4,254,653
[45] Mar. 10, 1981

[54] ELECTROMAGNETIC FUEL INJECTOR CALIBRATION

[75] Inventors: Gary L. Casey, Troy; Albert Blatter, Southfield; John A. Miller, Auburn Heights; William B. Claxton, West Bloomfield, all of Mich.

[73] Assignee: The Bendix Corporation, Southfield, Mich.

[21] Appl. No.: 111,426

[22] Filed: Jan. 11, 1980

Related U.S. Application Data

[62] Division of Ser. No. 956,692, Nov. 1, 1978.

[51] Int. Cl.³ .............................................. G01F 25/00
[52] U.S. Cl. ...................................... 73/3; 73/119 A
[58] Field of Search ...................... 73/1 R, 3, 119 A; 123/32 EA; 251/141

[56] References Cited

U.S. PATENT DOCUMENTS

| | | | |
|---|---|---|---|
| 3,828,247 | 8/1974 | Kirsch et al. | 73/119 A X |
| 3,936,030 | 2/1976 | Putschky | 251/141 X |

*Primary Examiner*—Jerry W. Myracle
*Attorney, Agent, or Firm*—William A. Marvin; Russel C. Wells

[57] ABSTRACT

A high flow rate electromagnetic injector valve with a rapid response time and a method for calibrating such injector is disclosed for utilization in a single point fuel injection system. Centrally bored end caps are fixed at the front and rear ends of a tubular injector body and a coil wound on a bobbin is disposed inside the body chamber between the end caps. The front end cap receives within its bore a valve assembly including a valve housing and a needle valve with attached armature reciprocally movable against a valve seat to obturate a metering orifice in the valve housing. The valve housing contains fuel inlets for the pressurized entry of fuel into the injector and the needle valve is ported to provide fluid communication to the armature to relieve pressure build-up. The rear end cap mounts within its bore a core member acting as a stator which extends through a central bobbin bore to form a controllable air gap adjacent the armature, the core member further contains internally an adjustment screw and ball member. The ball member and adjustment screw cooperate with a recessed closure spring positioned substantially within the armature to controllably bias the needle valve against the valve seat. By the adjustment of the core member and the adjustment screw both the static fuel flow and the dynamic fuel flow of the injector are respectively calibrated.

3 Claims, 5 Drawing Figures

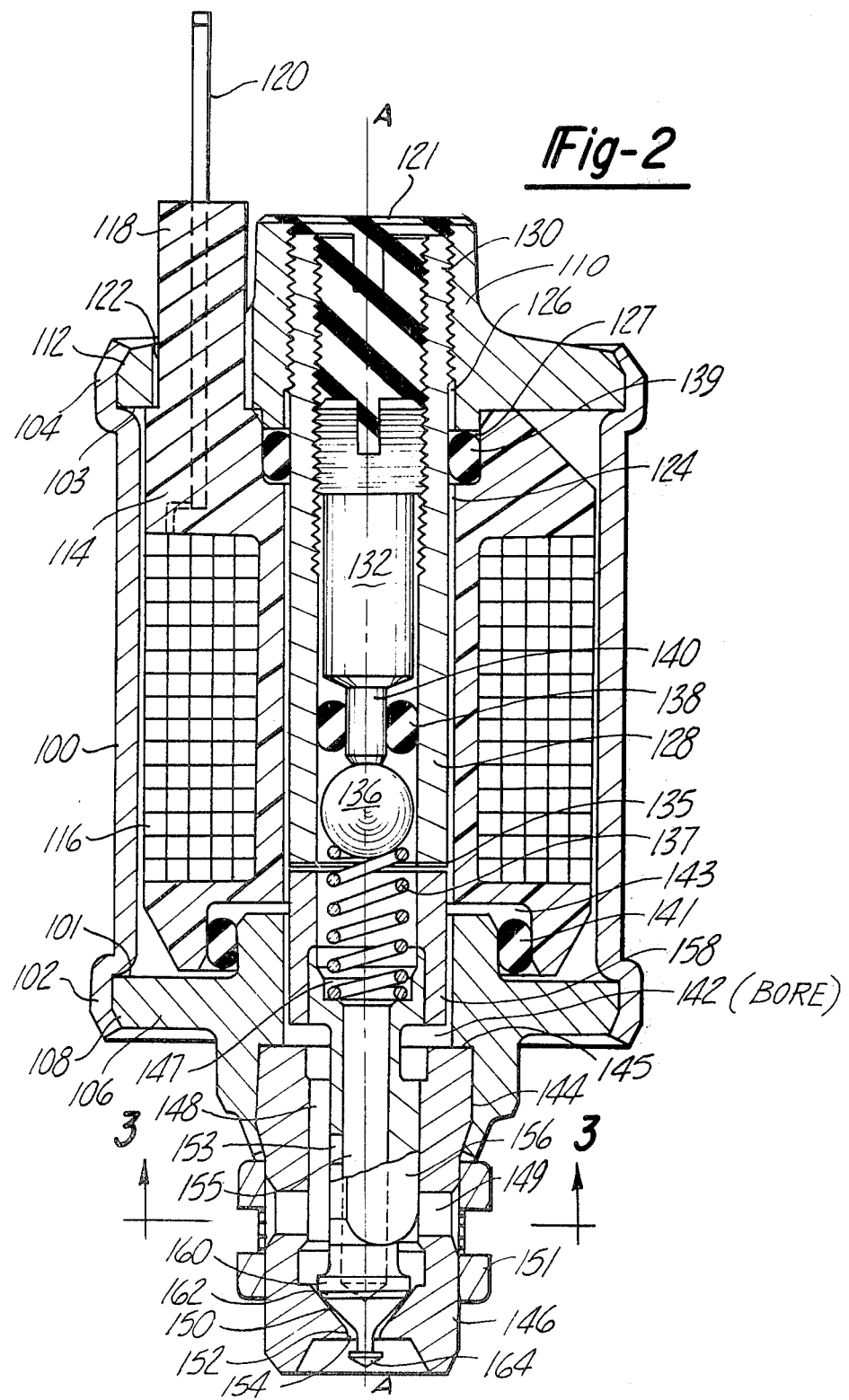

ELECTROMAGNETIC FUEL INJECTOR CALIBRATION

This is a division of application Ser. No. 956,692, filed Nov. 1, 1978.

FIELD OF THE INVENTION

The invention pertains generally to electromagnetic injector valves and is more particularly directed to a fast-acting high-flow rate single point injector valve.

BACKGROUND OF THE INVENTION

Electromagnetic fuel injection valves are gaining wide acceptance in the fuel metering art for both multi-point and single point systems where an electronic control system produces a pulse width signal representative of the quantity of fuel to be metered to an internal combustion engine. These injectors operate to open fuel metering orifices leading to the air ingestion paths of the engine by means of a solenoid actuated armature responding to the electronic signal. Because of recent advances, these injectors are becomming very precise in their metering qualities and very fast in their operation. With these advantages, the electromagnetic fuel injector valve will continue to assist the advances in electronic fuel metering which improve economy, reduce emissions, and aid drivability of the internal combustion engine.

The electromagnetic injector valve is, however, relatively expensive to manufacture because of a precision metering portion which must be carefully coupled to a magnetic motor circuit and, thereafter, to an electrical control while being contained in a single injector body. All of these sections must cooperate properly for the valve to provide maximum performance and should be contained in the minimum space. It is important in single point metering applications where the injector is mounted above the throttle plate that the injector package not block air flow into the air ingestion bore.

The injector body manufacture has been one contributor to the expense of manufacturing an injector valve. Generally, the injector body is manufactured from a cylindrical metal blank by a plurality of automatic machining operations. The most common configuration is a plurality of differently stepped or diametered bores which are machined to close tolerances and which form shoulders at the steps with the bores coaxial to each other. Such an injector body is illustrated in a U.S. Pat. No. 3,967,597 issued to Schlagmuller. The close tolerance or the depth of the bores in relationship to the others are used to locate other points of the injector, such as the valve closure portion precisely with respect to the moving section of the valve which contains the armature and stator.

Usually, all the bores are coaxial because the fluid flow path is centrally located through the valve and the needle valve is biased against a conical seat and should have an equal peripheral sealing pressure around the seat. The precision of the depth of the multiple step bores, their coaxial relationship, and their number generally requires that the injector body has to be chucked or remounted more than once during the machining operation which adds expense to the manufacturing costs. An injector that could be manufactured from parts requiring only a single machining operation or by eliminating altogether a part requiring multiple machining operations would be desirable.

The static and dynamic fuel flow characteristics are important to the operation of the injector valve and are controlled by a number of different parameters. In an electromagnetic valve, to provide a fast acting valve with a stable dynamic fuel flow, the opening and closing times must be minimized but kept relatively certain and reproducible. One factor directly influencing the opening and closing times of the injector is the closure force that the valve spring applies to the needle valve. The amount of spring pressure is linearly related to the amount the spring is compressed, or $F=Kx$ where x is the compression distance. The higher the closure force, the slower the opening time of the valve will be, and, conversely, the faster the valve will close.

Another interrelated factor is the distance through which the magnetic force acts upon the armature, and thus, the amount of travel the needle valve takes from the valve seat, or, as it is commonly called, the lift of the valve. The longer the lift or the greater the air gap, the slower the valve will open. At the other extreme, there is a minimum air gap that should be maintained to allow the collapse of the magnetic field when the injector is deenergized. If the minimum gap is not maintained during operation, the armature will tend to stick to the stator, and thus, affect the closing time of the valve.

In many prior art valves the lift is designed to be greater than that which would restrict static fuel flow. Therefore, the size of the metering orifice is designed to be the only controlling factor of flow rate when the valve is open. This is not an optimal design because the lift is greater than necessary thereby affecting the opening time of the valve, and a valuable control parameter for regulating the static flow rate has not been utilized.

In the Schlagmuller reference, the lift of the prior art valve is controlled by a spacer collar abutting a precisely machined spacer washer of a fixed thickness and the spring pressure force is adjusted upon assembly of the valve by axial movement of the core member which is then pinned to fix the pressure. In this valve the lift is structurally set and subsequently the spring pressure adjusted and fixed during assembly to a set value. The lift is such that static fuel flow is controlled only by the size of the metering orifice. These valves which have a static fuel flow out of tolerance must be disassembled and their metering orifices rebored.

It would be highly desirably, since the two factors of lift and closure forces are very much related to static fuel metering and the speed of valve operation, if they could be independently adjusted so as to complement each other. Further, it would be advantageous to adjust these characteristics of the electromagnetic injector valve after assembly to precisely tailor each valve characteristic.

Another problem that has affected the speed of operation and reproducible opening and closing times of the electromagnetic injector valve has been the eccentric loads from the closure spring whereby the needle valve has a component or plurality of force components applied to it not acting coaxially to the spray axis. This causes wear on the bearing surfaces which hold the needle coaxial with the spray axis and frictional spots where the valve hesitates as it moves within the valve housing. The long moment arm through which the closure spring acts is primarily responsible for the eccentric loads. The closure force is usually applied to the armature at the point on the needle valve farthest from the valve seat which acts as a fulcrum. Any axial offset force is magnified by the moment arm and must be absorbed and balanced by the needle valve bearing surfaces.

Torsional or windup pressures on the closure spring will also produce a change in the force provided against the needle valve. If possible, while adjusting the spring pressure, winding the spring or providing a torsional component to the closure force should be avoided and only substantially coaxial compression should be applied to the closure spring.

Another problem that has occured in single point electromagnetic injector valves with fuel inlets located substantially at the valve end is that fuel will be drawn up the guide bore of the armature and into the air gap between the core member and the armature when movement between them occurs. As the guide bore and armature form a relatively small clearance so as to maintain the needle coaxial, fuel that finds its way into the air gap will build up pressure due to the pumping action of the armature against the core. This phenomenon of increasing hydraulic pressure at the interface of the movement will cause a slowing in the opening time of the valve. In this type of single point injector it would be highly desirably to provide a means to relieve this pressure so as not to create any detrimental affects on the dynamic operation of the valve.

As the electromagnetic fuel injector is accepted in wide-spread use, there will have to be an extension of the environmental temperature range over which it is operational. One present limitation of prior art valves has been their cold temperature operation because of the sealing properties of the O-rings contained therein. Generally, the O-rings are elastomeric rings of rubber or material which remains substantially flexible at normal ambient temperatures or increased temperatures. They seal relatively well between the dissimilar materials of the injector body and the bobbin which expand and contract at different volumetric rates. However, at colder temperatures, especially in the ranges beyond $-20°$ F., they start to become inflexible and fairly brittle. At this point the dissimilar contraction rates between the bobbin and injector body will cause a separation between the O-ring and its interface and consequent leakage of pressurized fuel. It would be advantageous to provide an injector with an extended cold temperature range whereby the O-ring sealing structure could be extended in operation to approximately $-40°$ F.

SUMMARY OF THE INVENTION

A high flow rate electromagnetic injector valve with a rapid response time is provided by the invention. The injector valve of the present invention is inexpensive to manufacture and has a linear dynamic flow down to small injection pulse widths. These advantages have been provided by solving or ameliorating many of the problems herein mentioned with respect to the prior art electromagnetic injector valves.

The injector valve comprises a facile manufacturing configuration wherein a tubular injector body is provided with a centrally bored end cap fixed to each end. A bobbin wound with a coil and having a central bobbin bore is contained within an injector body chamber between the two end caps. The injector valve includes means for connecting the coil to a source of an injection signal.

The front end cap receives within its central bore a valve assembly including a needle valve and valve housing. The needle valve is reciprocal in a valve housing bore to open and obturate a metering orifice in the valve housing. The valve housing bore is supplied with fuel under pressure which is to be metered with respect to the open and closed durations of the needle valve.

The front end cap bore has a single step forming a shoulder and the valve housing is inserted in the central bore of the front end cap to where it abuts the shoulder. The valve needle extends past the step and into the rear portion of the front end cap bore which forms an armature guide bore. An armature for the injector is coupled to the needle valve with an interference fit and is guided in the armature guide bore to reciprocate therein and move the needle valve therewith. A closure spring applies a force against the needle valve to hold the valve closed. The rear end cap receives within its bore a core member extending into the bobbin bore to form an air gap between the armature and the core member.

When an injection signal is applied to the coil, a magnetic field is formed through the magnetic circuit of the core member, end caps, injector body, and armature. The field will attract the armature across the air gap and when it overcomes the force of the closure spring will open the valve by movement of the needle valve. A collapse of the magnetic field upon turning off the injection signal wll cause the valve to close as the spring seats the needle valve.

According to this aspect of the invention, there is no precision machining operation that must be accomplished on the injector body and only single machining operations are necessary for either end cap. This eliminates the multiple remounting of parts on a machine tool during manufacture and substantially reduces the cost of the overall injector structure.

The thin-walled tubular body further provides an adequate magnetic path for the magnetic motor circuit while increasing the inside chamber area of the body available for the coil, thereby retaining a slim silhouette while increasing the force available from the electromagnet. A larger electromagnet produces a greater magnetic force for a faster acting valve and the slim silhouette is advantageous for mounting in an air ingestion bore of a single point fuel injection system.

With the front end cap mounting the valve assembly, exact concentricity between the armature and the stationary electromagnetic elements, including the coil and core member, does not have to be strictly maintained. The armature and needle combination is guided with respect to the front end cap and is separated from the stationary elements by the air gap. This reduces the number of parts which have to be very closely toleranced as to length and diameter.

With respect to another aspect of the invention, the armature of the injector valve contains within a central bore the closure spring which fits into a recess in the needle at the point of juncture with the armature and extends outwardly from the armature bore into the air gap of the injector valve. An internal bore of the core member is provided with an adjusting screw having an end pin which forces a ball member against the spring adjustably to provide a compressive force. The adjusting screw is aligned substantially with the needle valve to adjust the closure spring force and transfers its motion through the ball member to the spring. Adjustment of the closure force is accomplished by turning the adjusting screw to the desired position.

This configuration, having the spring contained within the armature and set against a recess in the needle valve, moves the point of closure force application forward of the armature and reduces the moment arm through which it acts. Less eccentric or oblique forces are applied on the needle valve thereby allowing more coaxial closure force. Further, the ball member prevents a windup of tortional force to be applied to the spring so that the compression force is linear with the distance of compression.

With respect to still another aspect of the invention, the core member is independently adjustable within the bobbin bore to provide an adjustable lift for the valve armature separately from the closure force adjustment. The end of the core member is provided with a washer-shaped nonmagnetic shim member which is configured so as not to affect the opening time of the valve and to provide a fixed air gap while the injector is energized to aid the closing time.

The adjustable core member and adjustable closure force are adapted to tailor the static and dynamic fuel flow of the valve after assembly. The preferred method for accomplishing the adjustment is to measure the static flow of the injector valve and trim the flow to the desired rate with movement of the core member. The static adjustment is made in an area where flow rate is dependent not only on the size of the metering orifice but also on the lift. This lift adjustment will also change the dynamic characteristics of the valve because of the change in air gap. The amount of change will be substantially indeterminable before assembly of an individual valve. The dynamic flow rate of the injector can subsequently be corrected and calibrated by adjusting the closure force with the adjusting screw relative to the changed air gap to assure a desired dynamic characteristic.

With respect to another aspect of the invention and particularly for single point applications, the fuel inlets of the injector valve are provided proximately to the metering orifice upstream the needle valve and valve seat interface. The fuel inlets communicate fuel under pressure to the valve housing bore. The needle valve is, in the preferred embodiment, hollow with an inner passage which communicates with the recess in the valve end and the armature bore. The inner passage of the needle valve further communicates through inlet apertures with the valve housing bore to provide pressure relief to the air gap between the armature and core member to prevent hydraulic pressure from building and detrimentally affecting the opening time of the valve.

With respect to still another aspect of the invention, the valve is sealed by a pair of elastomeric O-rings contained under compression within recesses of the bobbin and surrounding dissimilar material of the front end cap and core member. The material of the front end cap and core member contracts more slowly than does the material of the bobbin and, therefore, as the temperature decreases a tighter squeeze will be applied to the sealing rings. The tighter squeeze will extend the cold temperature range of the injector into the −40° F. range. The increasing pressure compensates for the decreasing elastomeric response of the O-rings and their decreased sealing properties at the colder temperatures.

These and other features, advantages and aspects of the invention will be more fully understood and better explained if a reading of the detailed description is undertaken in conjunction with the appended drawings wherein:

BRIEF DESCRIPTION OF THE DRAWINGS

FIG. 2 is a cross-sectional side view of the electromagnetic injector valve illustrated in FIG. 1;

DETAILED DESCRIPTION OF THE PREFERRED EMBODIMENT

Figure 1:
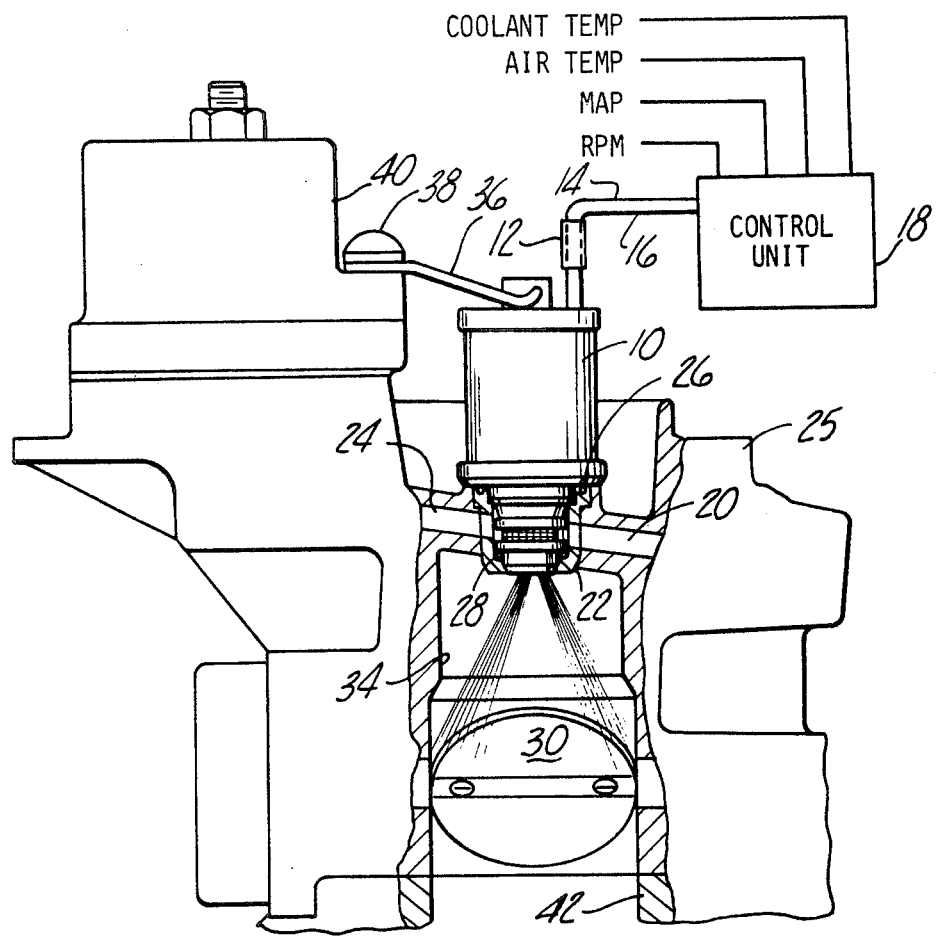
FIG. 1 is a partially sectioned side view of a single point injection system with a high flow rate fastacting electromagnetic injector valve constructed in accordance with the invention.

With reference now to FIG. 1, there is shown a single point injection system for metering fuel to an internal combustion engine. The system comprises an electromagnetic injector valve 10 which is electrically connected by a set of conductors 14,16, of a connector 12 to a control unit 18. A number of engine operating parameters are input to the control unit 18 including the speed or RPM at which the engine is turning, the absolute pressure of the intake manifold (MAP), the temperature of the air ingested, and the engine coolant temperature by means of conventional sensors.

The injector 10 fits within an injector fuel jacket 22 centrally located in a single air induction bore 34 of a throttle body 25 communicating with an intake manifold 42 of the internal combustion engine. For throttle bodies with multiple air induction bores, an injector per bore can be utilized. Air flow for engine ingestion is regulated by a throttle plate 30 which is rotatably mounted below the injector jacket 22. Upon the sensing of the operating conditions of the engine, the control unit will provide pulse width electronic injection signals to the connector 12 representative of fuel quantity desired for injection whereby the injector 10 will open and close relative to the leading and trailing edges of the signal to meter fuel from the injector jacket 22. The fuel is metered in a wide spray angle pattern for optimum mixture with the incoming air and delivery into the intake manifold.

Fuel under pressure is delivered to the injector jacket 22 by a fuel inlet 20 and is circulated through the interior of the injector jacket and thereafter to an exit passage 24 where a pressure regulator 40 maintains the systemic pressure constant. Spent fuel is returned to a reservoir, such as a fuel tank, where it can be then pumped under pressure to the jacket 22 once more. The injector is sealed in the jacket by suitable resilient means, such as an 0-ring 28 at the bottom end of the jacket, and an O-ring 26 resting against a shoulder at the top end of the jacket. The injector 10 is held in position by a spring clip 36 fixed by a screw 38.

Such a single point fuel injection system as shown is particularly adaptable to run a 2.2 liter engine having four cylinders. By injecting twice every revolution or 180° an air/fuel charge per each cylinder firing is delivered. The injection is preferably made at some set angle relative to an engine event, such as just prior to top dead center (TDC) of the number 1 cylinder on the intake stroke, and thereafter cyclicly related to that point. The injection timing of firing just before the opening of a particular intake valve allows much of the fuel and air charge to be transported to the particular cylinder injected. This reduces condensation and helps eliminate cylinder-to-cylinder distribution errors.

To inject a system as that described above, an injector with a high single point fuel rate of 400-600 cm$^3$/min. and with a dynamic characteristic linear into the one millisec range is needed. The invention provides such an electromagnetic injector valve 10 with an advantageous construction.

Figure 3:
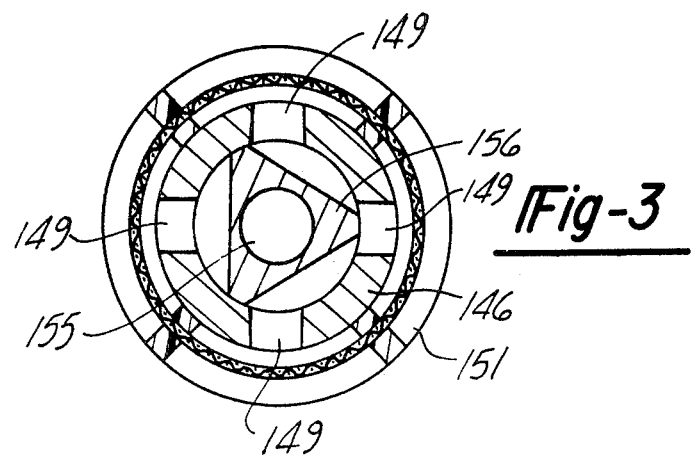
FIG. 3 is a cross-sectional end view of the injector valve housing of the injector illustrated in FIG. 2 which is taken along section line 3—3 of that figure.

With reference now to FIGS. 2 and 3, the high flow injector valve 10 is shown in cross-section to advantage and comprises a tubular injector body 100 which may be constructed from seamed or unseamed tubing which has been cut to length. The injector body 100 is cold-formed at each end to form a shoulder 101 with a radially offset rim portion 102 at the front end and a shoulder 103 with another radially offset rim portion 104 at the rear end. As the tubular body 100 is part of the magnetic circuit of the injector, the material used is preferably standard low carbon steel mechanical tubing. This material provides excellent mechanical strength and exhibits high permeability. The body 100, as well as all other outside surfaces of the injector valve 10, can be treated by conventional methods for corrosion resistance and environmental hazards.

A front end cap 106 has a centrally bored cylindrical body that is flanged to abut against the shoulder 101 and is fixed in position by crimping or swaging the rim 102 against a bevel 108 machined on the flange. Similarly, a rear end cap 110 comprising a centrally bored cylindrical body is flanged and abuts the shoulder 103 and is affixed thereat by deforming rim 104 to mate with a bevel 112 machined in the flange of the cap.

Within the chamber defined by the inner wall of the injector body 100 and the inwardly facing surfaces of the front end cap 106 and rear end cap 110, is a generally elongated molded bobbin 114 wound with a plurality of turns of magnet wire forming a coil 116. The coil 116 is electrically connected to a set of terminal pins 120 (only one shown) which rearwardly exit through an oval-shaped aperture 122 in the rear end cap 110 and are protected by a connector 118 integrally molded as part of the bobbin 114.

The bobbin 114 has a centrally located longitudinal bobbin bore 124 which is substantially coaxial with a threaded rear end cap bore 126. A rod-shaped core member 128 of a soft magnetic material is screwed into the threads of the end cap bore 126 and extends substantially the length of the bobbin bore. The core member 128 is slotted at its threaded end 130 to provide for adjustment of its extension in the bobbin bore 124. The adjustment of the core member determines the air gap distance and the lift of the valve. An adjustment screw 132 is threaded into an internal bore of the core member 128 to provide adjustment of the valve closure force by means of a pin 140 moving against a spherical ball member 136. The internal bore of the core member 128 is sealed by an O-ring 138 slipped over the pin 140 and sealing against the inner surface of the bore.

The bobbin bore 124 is hydraulically sealed at the internal face of the rear end cap 110 by an O-ring 139 and sealed at the front end cap 106 by an O-ring 141. These sealing means are under compression, at normal ambient temperatures (65° F.), between two materials with different thermal expansion and contraction rates. O-ring 139 is compressed in an annular space formed by the outside cylindrical surface of the core member 128 and the inside cylindrical surface of a recessed area 127 of the bobbin 114. O-ring 141 is compressed in a similar annular area formed by the outside cylindrical surface of a rearward extension of the body of the front end cap 106 and the inside cylindrical surface of a recessed area 143 in the bobbin 114.

The end cap 106 and core member 128 materials are similar low carbon steels while the bobbin 114 is molded from a glass fiber reinforced nylon. The inside cylindrical surfaces of the bobbin and the outside cylindrical surfaces of the end cap and core member all contract radially during a decrease in temperature. The bobbin, however, contracts more rapidly because of its differing material and increases the compression at lower temperatures. The increasing pressure applied by the more rapidly contracting bobbin will extend the cold temperature range of operation of the valve by compensating for the lack of flexibility in the O-ring seals below $-20°$ F.

Located in the cntral bore 107 of the front end cap 106 is a single step dividing the bore into an armature guide bore 142 and a mounting bore 144. A valve housing 146 is received in the mounting bore 144 until it abuts the internal shoulder 145 formed at the step between the bores. The valve housing 146 is held in place by bending the front rim of the mounting bore 144 over a chamfer in the valve housing 146. The valve housing 146 has a longitudinal valve housing bore 148 which communicates on one end with the armature guide bore 142 and at the other end is terminated with a conical valve seat 150 which curves into a smooth transitional area 152 to finally become a cylindrical metering orifice 154.

The valve housing bore 148 is in fluid communication with fuel in the jacket 22 by means of a plurality of fuel inlets 149 spaced around the valve housing 146. The inlets 149 are proximate to the metering orifice 154 for minimum pressure drop during low pressure operation and are protected from contamination by the surrounding mesh of a molded filter element 154 slip-fitted onto the valve housing.

Reciprocal in the valve housing bore 148 is a valve needle 156 which is press-fitted at its distal end into a generally annular-shaped armature 158. The needle valve, as is further illustrated in cross-section in FIG. 3, has a medial section which is triangular in cross-section and at each angular apex forms a curved bearing surface which slides against the valve housing bore 148 to center the needle valve within the bore.

The needle valve extends into a valve tip 160 having a sealing surface 162 which mates with the conical valve seat 150 to close the valve. From the valve tip the needle valve forms a pintle which ends in a deflection cap 164 which shapes the fuel spray into the hollow-cone or wide angle spray pattern as described hereinabove. The deflection cap is recessed in the injector housing 146 for protection.

The needle valve 156 is substantially hollow with an inner passage 155 drilled from the valve tip to its valve end connection at the armature 158. The valve end has a spring recess 147 supporting a closure spring 147 within the centered bore in the armature 158. The passage 155 communicates with the valve housing bore 148 by means of a port 153 cut into each face of the medial section of the valve needle. The passage 155 and centered armature bore thus provides pressure relief to an air gap located between the armature and core member to prevent hydraulic forces from increasing there and affecting the opening time of the valve.

The closure spring is compressed by the ball member 136 against the valve needle recess 147 to produce a closure force on the valve needle which can be adjusted by turning adjustment screw 132. Torsional winding forces are not generated during adjustment as the pin 140 will turn on the ball member 136 and cause only axial movement of member. Any tendency on the part of the closure spring to wind up will cause slippage against the surface of the ball member and dissipation of the torsional force component.

The closure spring, by being contained in the armature 158 and recessed in the valve end, applies the closure force forward of the air gap and reduces the moment arm through which eccentric force components act. Shorter and narrower bearing surfaces on the medial section of the valve needle can be used to balance the forces. The use of a shorter triangular medial section with less bearing surface in combination with the hollow valve needle and armature, significantly reduces the mass of the moving part of the injector. The reduction of the mass of the moving section and the increase in force produced by a enlargement of the coil will increase the opening time of the valve.

In operation, when current in the form of an injection signal is supplied to the terminal pins 120 from the connector 12, and thus, to coil 116, a longitudinal magnetic field is set up through the core member 128, the rear end cap 110, the injector body 100, and the front end cap 106 to attract the soft magnetic material of the armature 158 across the air gap to abut a nonmagnetic shim 135 on the face of the core member. The shim 135 aids the closing time of the valve by maintaining a minimum gap during energization. When the magnetic attraction overcomes the force of the closure spring, the valve needle will be lifted away from the valve seat and fuel will be metered by the valve seat interface and metering orifice until the current to the terminal pins 120 is terminated and the closure spring force seals the valve once more.

After assembly, the lift and air gap can be adjusted by turning core member 128 and the closure force adjusted by turning adjustment screw 132. The two adjustments will complement each other to calibrate static and dynamic fuel flow and then be set by a sealing component 121.

Figure 4:
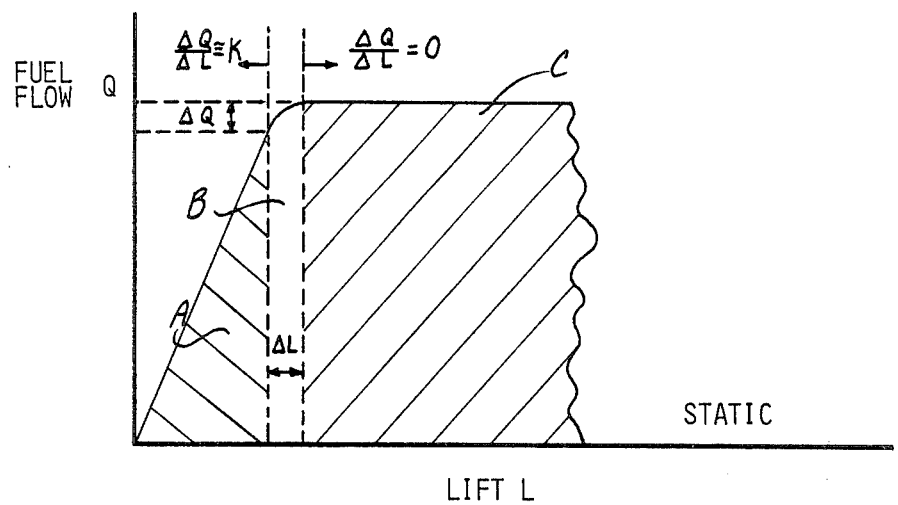
FIG. 4 is a graphical illustration of the static fuel flow of the valve illustrated in FIG. 2 as a function of the lift of the valve needle.

The static fuel flow adjustment of the valve will now be more fully explained with respect to FIG. 4. The static fuel flow Q of the injector valve 10 is graphically illustrated as a function of valve lift L. At small valve lifts in region A, the restriction produced by the needle valve and valve seat interface dominates and the static fuel flow is independent of the metering orifice size. In this region $\Delta Q/\Delta L$ is a relative constant K related to the increasing opening area between the interface of the needle valve and valve seat.

In region C where the lift is increased beyond where the valve needle provides a restriction to fuel flow, the metering orifice size is the determining factor of the static fuel flow. $\Delta Q/\Delta L$ in this region, as would be expected, is zero. Between regions A and C is a smaller region B where the static fuel flow of the injector valve is substantially a function of metering orifice size, but is also related to valve lift. $\Delta Q/\Delta L$ in this region is much less than K and is approaching the value of zero found in region C. The change in static fuel flow for a change of lift is related to the ratio of the changing interface area with respect to the metering orifice area.

By adjusting the lift in this region, a relatively controllable trim can be generated to calibrate the static fuel flow of an already assembled injector to a specified value. Generally, it has been found that this method will provide the optimal results if the range of trimming is 5% of the static fuel flow rate for a 0.001" change in lift. The adjustment threads on the core member 128 are suitably chosen to provide controllable lift changes in this region.

Figure 5:
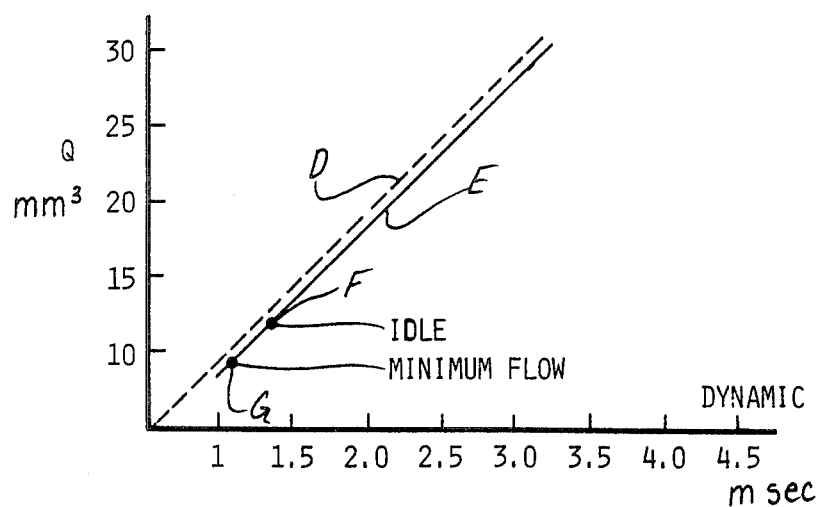
FIG. 5 is a graphical illustration of the dynamic fuel flow of the valve illustrated in FIG. 2 as a function of the injection signal duration.

After the static flow calibration, a dynamic calibration is undertaken to match the closure force to the air gap which was varied during static calibration and to calibrate the dynamic response. With respect to FIG. 5, the dynamic fuel flow rate as a function of pulse width is illustrated. The line D, which is dotted, indicates an ideal valve which has a static flow rate (slope) of 600 cm$^3$/min. and whose graphical representation goes through the origin.

The opening and closing times of a real valve are, however, finite and the actual dynamic characteristic will form a parallel line to the right of the ideal, for example, line E. The less ideal and slower the valve operates, the more to the right of line D the real dynamic line will be. Critical operation at higher engine speeds requires maximum injection quantity while the time available for injection is decreasing. High flow rate valves with steep dynamic slopes are necessary to meet these requirements, but cause very small pulse widths to be used for the minimum injection quantities. The closer the valve can be calibrated to ideal with linearity, the more advantageous it will be to the system.

With the goals in mind, the dynamic calibration is accomplished by picking the minimum flow rate of the valve at point G which is some safety factor below the minimum quantity injected at idle, or point F. The closure force is then adjusted to minimize the offset of line E from the ideal response at line D.

While the preferred embodiments of the invention have been shown, it will be obvious to those skilled in the art that modifications and changes may be made to the disclosed system without departing from the spirit and scope of the invention as defined by the appended claims.

What is claimed is:

1. A method of calibrating the static and dynamic fuel flow characteristics of an electromagnetic injector valve after assembly comprising the steps of:

providing an electromagnetic injector valve with an independently adjustable means for controlling valve lift and an independently adjustable means for controlling closure force after assembly;

measuring the static fuel flow of the injector valve with the valve open;

calibrating the static fuel flow by adjusting the lift of the valve and thereby changing the air gap;

measuring the dynamic flow of the injector; and calibrating the dynamic fuel flow by adjusting the closure force to produce a desired opening and closing time with respect to said air gap.

2. A method for calibrating the fuel flow of an electromagnetic solenoid injector as defined in claim 1 wherein said step of calibrating the static fuel flow includes:

adjusting the lift of the injector valve in a region of static fuel flow where the flow is substantially a function of metering orifice size but is dependent upon valve lift.

3. A method of calibrating the fuel flow of an electromagnetic solenoid injector as defined in claim 2 wherein said step of calibrating the dynamic fuel flow includes:

operating said injector with a minimum pulse width at a desired static flow rate; and adjusting the closure force to minimize the effects of the closing and opening times of the valve.

* * * * *